(12) United States Patent
Eicher et al.

(10) Patent No.: US 6,361,733 B1
(45) Date of Patent: Mar. 26, 2002

(54) ULTRASONIC INJECTION MOLDING

(75) Inventors: Ronald M. Eicher; Mitchell L. Whitted, both of Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/401,081

(22) Filed: Sep. 22, 1999

(51) Int. Cl.[7] .............................. B06B 1/02; B29C 45/46
(52) U.S. Cl. ........................................ 264/443; 264/478
(58) Field of Search ...................... 264/442, 443, 264/478

(56) References Cited

U.S. PATENT DOCUMENTS 4,678,420 A * 7/1987 Inoue ........................ 425/144
5,814,266 A * 9/1998 Pienkowski et al. ........ 264/443

* cited by examiner

Primary Examiner—Leo B. Tentoni
(74) Attorney, Agent, or Firm—Margaret A. Dobrowitsky

(57) ABSTRACT

Disclosed is an apparatus 10 and method of ultrasonic injection molding a plastic part including:

provide plastic pellets 12;

passing the pellets into a defined space 14 in an ultrasonic horn apparatus 16;

applying ultrasonic energy to the horn thereby permitting flow of the melted plastic;

applying a force to a plunger 18 which forces the melted plastic into a mold 24 of a desired shape; and recovering the desired part.

7 Claims, 1 Drawing Sheet

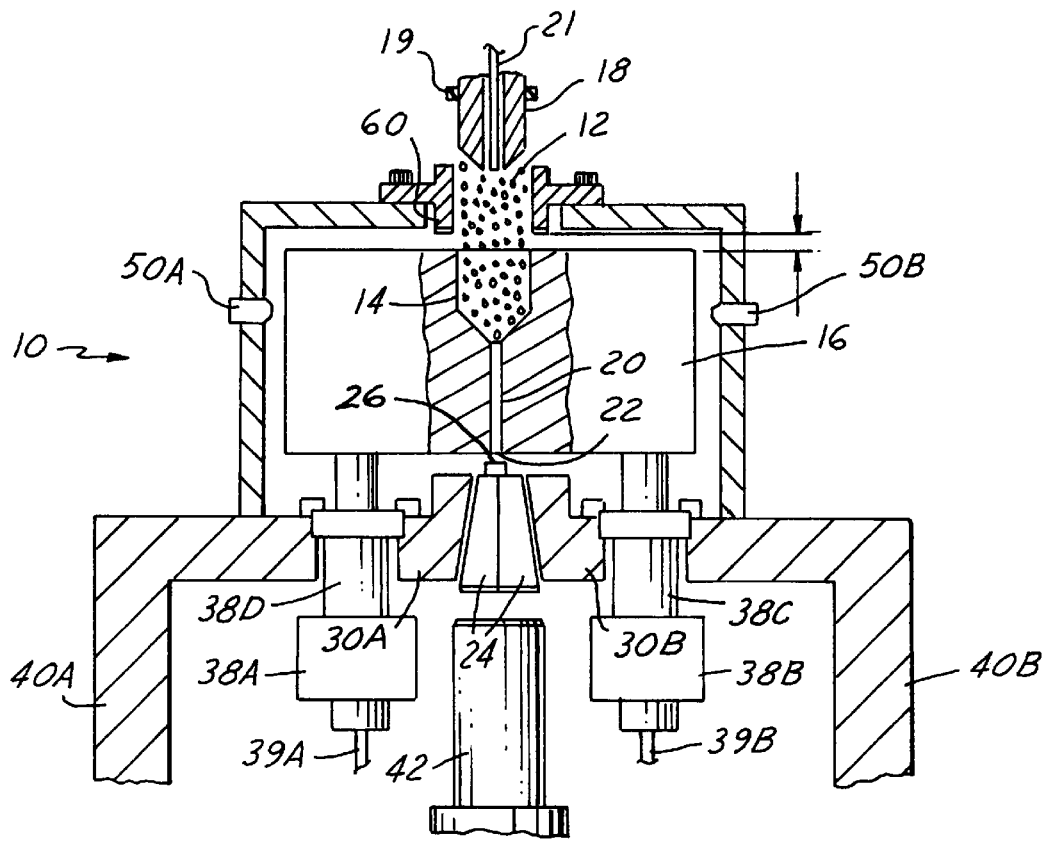
FIG. 1
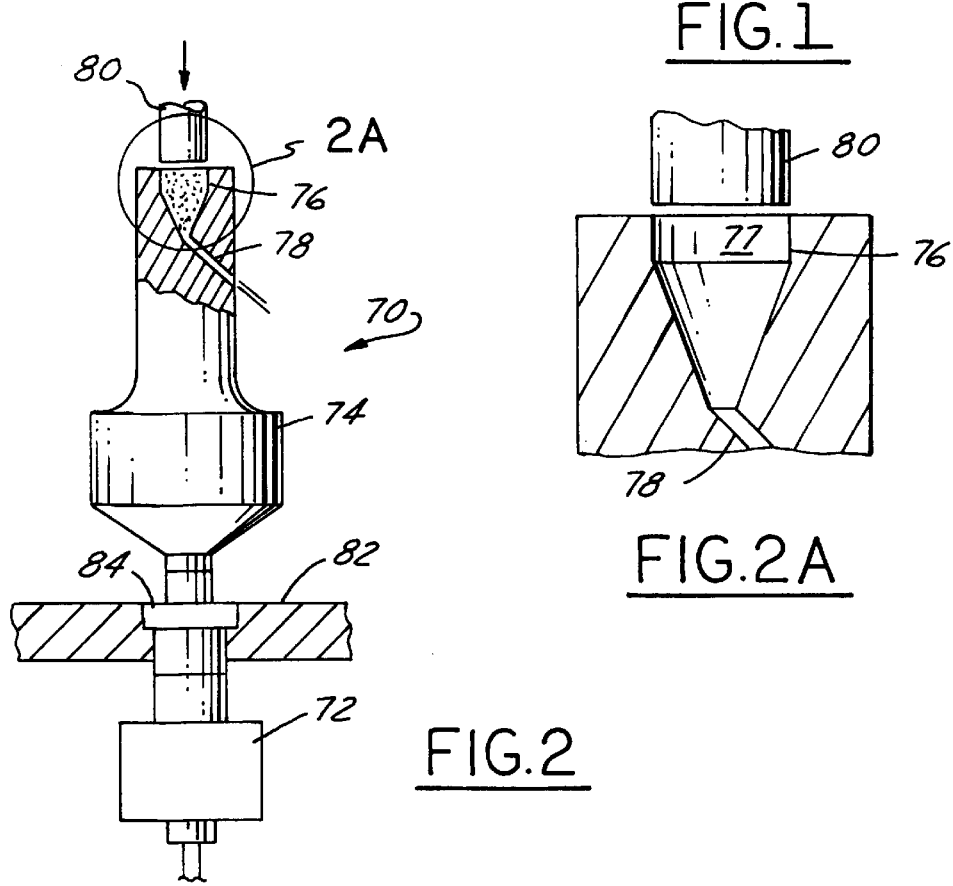
FIG. 2
FIG. 2A

ULTRASONIC INJECTION MOLDING

FIELD OF THE INVENTION

The field of the invention is the manufacture of plastic moldings utilizing injection-molding techniques to melt the plastic material utilizing ultrasonic energy.

BACKGROUND OF THE INVENTION

In traditional injection molding techniques, there is a requirement that a consistent cycle is utilized to manufacture parts. This is partially due to the thermal sensitivities of the plastic polymers being processed. Under extended period of increased temperature, the plastic will degrade. To overcome the continued exposure of the plastic to high temperature, improvements in handling the plastic pellet is needed.

U.S. Pat. No. 4,469,649 pertains to an apparatus for transforming the physical characteristics of a material by controlling the influence of rheological parameters.

U.S. Pat. No. 4,793,954 describes utilization of ultrasonic vibration when applied to the thermoplastic processing apparatus such as an extruder for an injection-molding device. The ultrasonic vibration is applied to the die of the processing apparatus in a direction longitudinal to the flow of the thermoplastic.

U.S. Pat. No. 5,433,112 describes an apparatus for ultrasonically characterizing a polymer melt flowing in a predetermined direction between two opposed parallel surfaces spaced from one another to define a gap filled with polymer. Ultrasonic vibration is discussed in U.S. Pat. No. 5,885,495. See also U.S. Pat. No. 4,487,728 as to high frequency vibration and U.S. Pat. No. 3,717,427 as to a resin vibration system.

It is an objective of the patent application to utilize ultrasonic energy to rapidly heat and melt plastic pellet material and then to use a plunger to force the molten plastic into a mold cavity whereupon the ultrasonic energy is turned off allowing the polymer to re-solidify.

SUMMARY OF THE INVENTION

Described is a method of injection molding a plastic part comprising:

providing plastic pellets;

passing the pellets into a defined space in an ultrasonic horn apparatus;

applying ultrasonic energy to the horn to melt and permit flow of the plastic;

applying a force to a plunger which forces the melted plastic into a mold of a desired shape; and recovering the desired part from the mold.

BRIEF DESCRIPTION OF THE DRAWINGS

FIG. 1 is a schematic illustration of a proposed production apparatus of the present invention with a partial cutout showing the plastic pellets in the ultrasonic horn portion of the apparatus.

FIGS. 2 and 2A are a schematic illustration of a prototype apparatus of the present invention.

DESCRIPTION OF PREFERRED EMBODIMENTS

The present invention is directed towards forming plastic materials through the utilization of ultrasonic energy to melt the plastic pellets and extrude or inject the molten plastic. The process makes the plastic molded parts.

Basically, plastic pellets 12 are loaded into a machined pocket 14 in an ultrasonic horn 16. A plunger then applies a force to the unmelted plastic pellets. Then the horn is activated with ultrasonic energy, which melts the plastic at the bottom of the machined pocket of the weld horn. The plunger and the unmelted plastic pellets next to it push the molten plastic into a channel that extends out of the bottom of the pocket in the weld horn. The channel or runner directs the molten plastic flow to an opening in the horn where it exits.

The ultrasonic frequency utilized could vary but 20 kHz was used and recommended due to the physical component size and power supply rating. Other known frequencies available are 15 kHz, 35 kHz and 40 kHz.

Turning to a discussion of the injection molding equipment 10 in the drawing (FIG. 1). First the ram 42 presses the mold halves together under pressure. Then plastic pellets 12 are loaded into a machined pocket 14 in the ultrasonic horn 16. A plunger 18 having plunger seal 19 then applies a force on the unmelted plastic pellets. Next, the horn 16 is activated with a 20 kHz frequency from the ultrasonic power supply, which melts the plastic at the bottom of the machined pocket in the horn. The plunger 18 and the unmelted plastic pellets next to it, pushes the molten plastic into a channel 20 that extends out the bottom of the pocket in the horn. The channel 20, or runner, directs the molten plastic flow to an opening in the horn where it exits 22 to the mold 24, which is shown having two halves. The plunger extension 21 is used to clear the plastic from the channel 20, either while the plastic is molten or after it is solidified and the mold is removed.

A seat 26 permits sealing the exit of the horn and the entrance to the mold 24 which is held in place by supports 30A and 30B. Ultrasonic converters 38A and 38B are affixed to 1:2.5 gain boosters 38C and 38D that are held in place by appropriate fastening means on the booster ring to the table sections 40A and 40B, respectively. Radio frequency cables 39A and 39B are attached to the converters and to a power source (not shown).

In the operation of the ultrasonic injection molding equipment the mold ram 42 is placed adjacent the bottom of the mold while the melted plastic is cycled into the mold and then back after plastic has solidified so the mold can be removed (FIG. 1).

The horn 16 is cooled by fluid such as air or liquid through inlets 50A and 50B.

A clearance of about 0.003 inches is maintained between the horn and the barrel inlet 60, to prevent the horn from contacting the barrel inlet at the existing amplitude.

The objective of ultrasonic injection molding is for one piece on demand to satisfy lean manufacturing. Currently a standard, flexible, low volume process does not exist for fabrication of injection molded parts. New requests for low volume manufacturing systems result in either high investment proposals for localized component fabrication or non-localized component fabrication.

In further developing the objective of the process, it should:

Be capable of being turned on and off without degrading the material

Support TAKT time production (Based on customer demand-target rate for material consumption.

$$TAKT = \frac{\text{Available Production Time}}{\text{Quantity of Parts Required}}$$

Be globally applicable

Reduce investment

Reduce floor space requirements

Ensure 85% operator utilization

The advantage of the ultrasonic development of this invention is that there is no warm up cycle (time) required for the molding equipment. Also, it does not heat, and potentially degrade, a larger amount of plastic than is necessary, as in conventional molding. The process rapidly heats only the material needed to make one part.

Additionally, the process is not sensitive to inconsistent cycles. This can yield a better quality part and less scrap.

There are also potential energy savings. The energy necessary to power the ultrasonic equipment can be turned on and off for each cycle, unlike traditional molding machines that must stay in a "powered up mode" while not cycling.

A wide variety of thermoplastic materials may be utilized including commodity and engineering plastics. Suitable materials are nylon (Polyamides), PET (Polyethylene Terephthalate), ABS (Acrylonitile Butadiene Styrene), PE (Polyethylene), PP (Polypropylene), PS (Polystyrene), PVC (Polyvinyl Chloride), and PPS (Polyphenylene Sulfide).

Other plastic materials that may be utilized are glass/mica polyester, engineering plastic, such as Rynite (a trademark of DuPont). The polyester is a modified polyethylene terephthalate. Another plastic is Akulon (a trademark of DSM EP); a glass fiber reinforced 6/6 nylon with a heat stabilizer and impact modifier. Another preferred plastic is Profax, (a trademark of Montel for polyethylene).

While the above has described the invention in general, listed below are preferred embodiments wherein all parts are parts by weight and all temperatures are in degrees Centigrade unless otherwise indicated.

EXAMPLES

The apparatus 70 as shown in the drawing (FIG. 2) was utilized with a 1000 watt Branson power supply (not shown) operating at 20 kHz. A circular high gain titanium horn 74, Branson catalog number 318-004-020, was mounted face up vertically. The machined face 76 was 12 inch deep by 1½ inch diameter pocket 77 and 0.125 diameter hole 78 angled out from the side of the horn. A 1:2.5 gain booster was used between the ultrasonic horn 74 and the converter 72. A plunger 80 was mounted over the horn with minimum clearance necessary to prevent the horn from contacting it. Approximately 20 psig (pounds/in$^2$ gauge) pressure was applied to the plunger 80 to move the plastic through the hole 78. The horn 74 was mounted to the table 82 by mounting ring 84. The following plastic materials were utilized:

Rynite 5231 pet with 35% glass fiber;

Mica reinforced with improved dielectric strength;

Akulon M-1016 PA66 with 33% glass fiber with heat stabilizer and impact modifier;

Fortron 1140L4 PPS 40% glass fiber reinforced with lubricant;

Profax SB786 PE-polyethylene.

It took approximately 15 seconds to melt the PA66 with a second shot of material. The initial shot of material had melted in the horn. A very high melt flow was obtained.

It took approximately 5 seconds to melt the PET material with a second load of material likewise utilized.

It took approximately 7 seconds to melt the PPS material in the first shot and 5 seconds to melt the PPS with the second shot and 4 seconds to melt the PPS to the third shot with 100% amplitude.

The times reflected above and the term "melt" refers to the time from the instant the ultrasonic energy was turned on until the plastic began to flow out of the runner 78 in the horn.

It has been found desirable that the higher wattage of 3000 watts would be desirable to provide more energy to the melting process as well as to allow quicker melting of the plastic and a larger volume of material melt per shot.

Since the ultrasonic amplitude is variable, increasing the amplitude allows faster melting of the plastic. It is anticipated that varying the pressure on the plunger during the extrusion or injection process would allow the processing conditions to be improved. It may likewise be desirable to have a cooling jacket about the weld horn in order to have consistent stable temperature during the short cycles.

The purpose of the plunger seal is to keep the molten plastic from slipping out of the horn past the plunger. The seal prevents the ultrasonic horn from directly contacting the plunger.

It is particularly desirable to have a homogeneous molten melt mix. This is particularly desirable when the plastic contains fillers and additives.

Bench top injection molding equipment is commercially available such as from Minijector Machinery Corporation of Newbury, Ohio. The company supplies products such as a V-mold and Wasp mold series injection molding equipment.

While the forms of the invention herein disclosed constitute presently preferred embodiments, many others are possible. It is not intended herein to mention all of the possible equivalent forms or ramifications of the invention. It is understood that the terms used herein are merely descriptive, rather than limiting, and that various changes may be made without departing from the spirit or scope of the invention.

What is claimed is:

1. A method of injection molding a plastic part comprising:

providing plastic pellets;

passing the pellets into a defined space in an ultrasonic horn apparatus;

applying ultrasonic energy to the horn thereby melting and permitting flow of the melted plastic;

applying a force to a plunger which forces the melted plastic into a mold of a desired shape; and recovering the desired part.

2. The method of claim 1 wherein melted and unmelted plastic pellets are present in the weld horn at the time the force is applied to the plunger.

3. The method of claim 1 further comprising cooling the horn after the melted plastic is pushed from the horn.

4. The method of claim 1 further comprising providing a channel from the defined space in the horn wherein the channel is more narrow than the defined space thereby constricting the flow of the melting pellets from the defined space to the mold; and compressing the plastic in the channel by the force on the plunger.

5. The method of claim 1 further comprising providing a channel from the defined space in the horn whereby the channel is more narrow than the defined space thereby constricting the flow of the melted pellets from the defined space to the mold;

removing the mold from the apparatus; and applying a force to a plunger extension which removes plastic remaining in the channel.

6. The method of claim 1 further comprising blending the plastic melt after applying the force to the plunger for compression of the molten plastic.

7. The method of claim 1, wherein the plastic is an engineering or thermoplastic material.

* * * * *